(12) United States Patent
Zhilin

(10) Patent No.: US 9,271,483 B2
(45) Date of Patent: Mar. 1, 2016

(54) EXTERNALLY-ADJUSTABLE FISHING REEL DRIVE GEAR PAIR BACKLASH ADJUSTMENT MECHANISM

(71) Applicant: Yangzhou Yuansheng Machinery Co., Ltd., Yangzhou (CN)

(72) Inventor: Xu Zhilin, Yangzhou (CN)

(73) Assignee: Yangzhou Yuansheng Machinery Co., Ltd., Yangzhou (CN)

( * ) Notice: Subject to any disclaimer, the term of this patent is extended or adjusted under 35 U.S.C. 154(b) by 197 days.

(21) Appl. No.: 14/152,481

(22) Filed: Jan. 10, 2014

(65) Prior Publication Data

US 2014/0252153 A1    Sep. 11, 2014

(30) Foreign Application Priority Data

Mar. 6, 2013   (CN) .......................... 2013 1 0069956
Mar. 6, 2013   (CN) .......................... 2013 2 0100421

(51) Int. Cl.
*A01K 89/01*         (2006.01)

(52) U.S. Cl.
CPC ...................................... *A01K 89/01* (2013.01)

(58) Field of Classification Search
CPC ............... A01K 89/01121; A01K 89/0102; A01K 89/01126; A01K 89/01125; A01K 89/015; A01K 89/0183; A01K 89/0192
See application file for complete search history.

(56) References Cited

U.S. PATENT DOCUMENTS

| | | | | | |
|---|---|---|---|---|---|
| 2,998,760 | A * | 9/1961 | Allen | ..................... | B21D 43/09 226/144 |
| 3,026,058 | A * | 3/1962 | Denison | ............. | A01K 89/0102 188/82.9 |
| 6,209,816 | B1 * | 4/2001 | Hitomi | ................... | A01K 89/01 242/310 |
| 2003/0209621 | A1 * | 11/2003 | Maeda | ................... | A01K 89/00 242/321 |
| 2004/0144877 | A1 * | 7/2004 | Kawasaki | ............ | A01K 89/015 242/278 |
| 2004/0227027 | A1 * | 11/2004 | Ochiai | ................. | A01K 89/027 242/246 |
| 2012/0080652 | A1 * | 4/2012 | Mann | ................... | B66D 1/7426 254/334 |

* cited by examiner

*Primary Examiner* — Emmanuel M Marcelo
(74) *Attorney, Agent, or Firm* — The Webb Law Firm

(57) ABSTRACT

Disclosed is an externally-adjustable fishing reel drive gear pair backlash adjustment mechanism which includes a drive spindle, a housing consisting of a main cover and a side lid, and a gear pair consisting of a rack and a main gear on the drive spindle; middle portions of the main cover and the side lid being respectively provided with a bearing mounting counterbore, bearings being respectively mounted at two ends of the drive spindle, the drive spindle being mounted in the bearing mounting counterbores of the main cover and the side lid through the bearings at two ends, the bearing of the side lid being bonded to the main gear, a backlash existing between the main gear and the rack; and an adjustment mechanism adjusting a gear pair backlash outside the housing.

4 Claims, 7 Drawing Sheets

EXTERNALLY-ADJUSTABLE FISHING REEL DRIVE GEAR PAIR BACKLASH ADJUSTMENT MECHANISM

CROSS-REFERENCE TO RELATED APPLICATIONS

This application claims priority to Chinese Patent Application Nos. 201310069956.2 and 201320100421.2, both filed Mar. 6, 2013, the disclosures of which are hereby incorporated in their entirety by reference.

BACKGROUND OF THE INVENTION

1. Field of the Invention

The present invention relates to the field of fishing articles, and specifically to an externally-adjustable fishing reel drive gear pair backlash adjustment mechanism.

2. Related Art

Fishing reel texture is a very important indicator of quality, and an axial gap between a main gear and a rack directly affects the texture of fishing reels. If the gap is too large, the texture will be loose, and affects the life of the gear; and if the gap is too small, the texture will be tight, and running is not smooth. Only when the gap achieves an ideal state, the texture may be soft and smooth. Therefore, good control over the axial gap of the gear will control the quality of the product to a great extent.

The common well-known method of adjusting an axial gap between a main gear and a rack is increasing/decreasing shims between the main gear and a side lid to adjust the axial gap between the main gear and the rack. Shortcomings of such a method lie in that, it is necessary to remove the side lid on the housing each time shims are increased or decreased, some complex fishing reels further need to remove a turret at first, the operation is very inconvenient, which delays the work and wastes the time, and damage to parts easily occurs during the removal. Besides, after the fishing reel has been used for a period of time, due to wearing of the main gear and the rack, the axial gap between the main gear and the rack will become large, the thickness of the original shim may not achieve the ideal adjustment gap, and the quality of the product may not be well guaranteed.

SUMMARY OF THE INVENTION

An objective of the present invention is to provide a fishing reel gear axial gap adjustment mechanism that can quickly and easily adjust an axial gap between a main gear and a rack and can well extend the service life of the product.

The technical solution achieving the above objective is: an externally-adjustable fishing reel drive gear pair backlash adjustment mechanism, including: a drive spindle, a housing consisting of a main cover and a side lid, and a gear pair consisting of a rack and a main gear on the drive spindle; middle portions of the main cover and the side lid being respectively provided with a bearing mounting counterbore, bearings being respectively mounted at two ends of the drive spindle, the drive spindle being mounted in the bearing mounting counterbores of the main cover and the side lid through the bearings at two ends, the bearing of the side lid being bonded to the main gear, a backlash existing between the main gear and the rack; characterized by further including an adjustment mechanism adjusting a gear pair backlash outside the housing.

The adjustment mechanism includes a first adjustment knob and a first fixed gland, the first adjustment knob is an annular body, the right end of the first adjustment knob is provided with an annular flange, the left sidewall of the annular flange is provided with a spiral ramp; the middle portion of the side lid is provided with a circular through hole, the through hole is internally provided with an annular shoulder, the right sidewall of the annular shoulder is provided with a spiral boss mating with the spiral ramp on the left sidewall of the annular flange on the first adjustment knob; the left end of the first adjustment knob passes through the circular through hole of the side lid from an inner side of the side lid to extend out of the side lid, the right end of the first adjustment knob is bonded to the bearing on the left end of the drive spindle, the left end of the first adjustment knob is fixedly connected with the first fixed gland, outer peripheries of the first fixed gland are evenly provided with fixed screw holes, and the fixed screw holes on the outer peripheries of the first fixed gland are connected with the side lid through screws.

The present invention can easily achieve the purpose of adjusting the backlash of the main gear and the rack without removing the housing and other parts, which has high efficiency, can avoid damage to the product by frequent disassembly, and extends the service life of the product.

DETAILED DESCRIPTION OF THE EMBODIMENTS

First Embodiment

Figure 1:
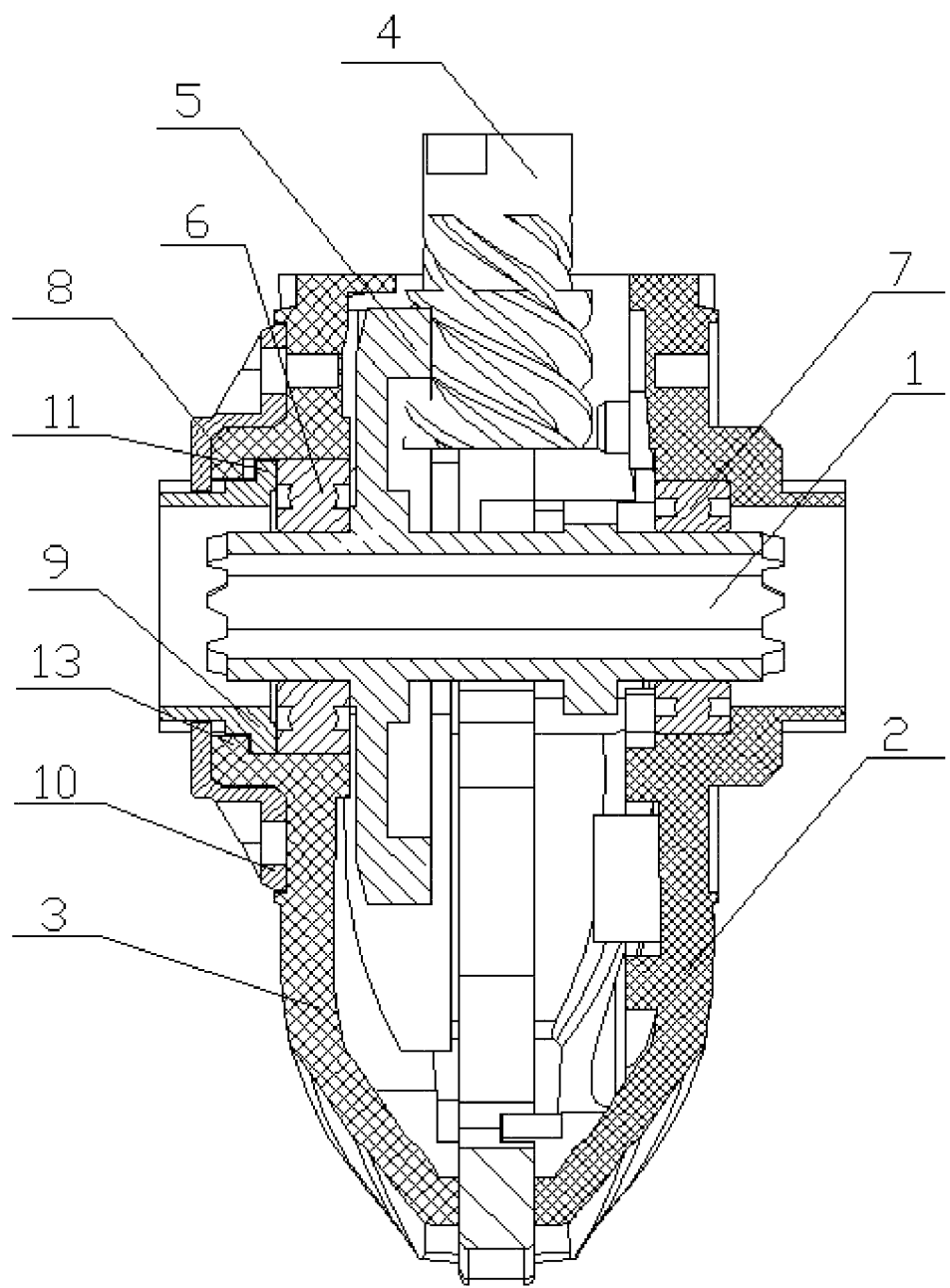
FIG. 1 is a schematic structural view of a first embodiment of the present invention.
Figure 2:
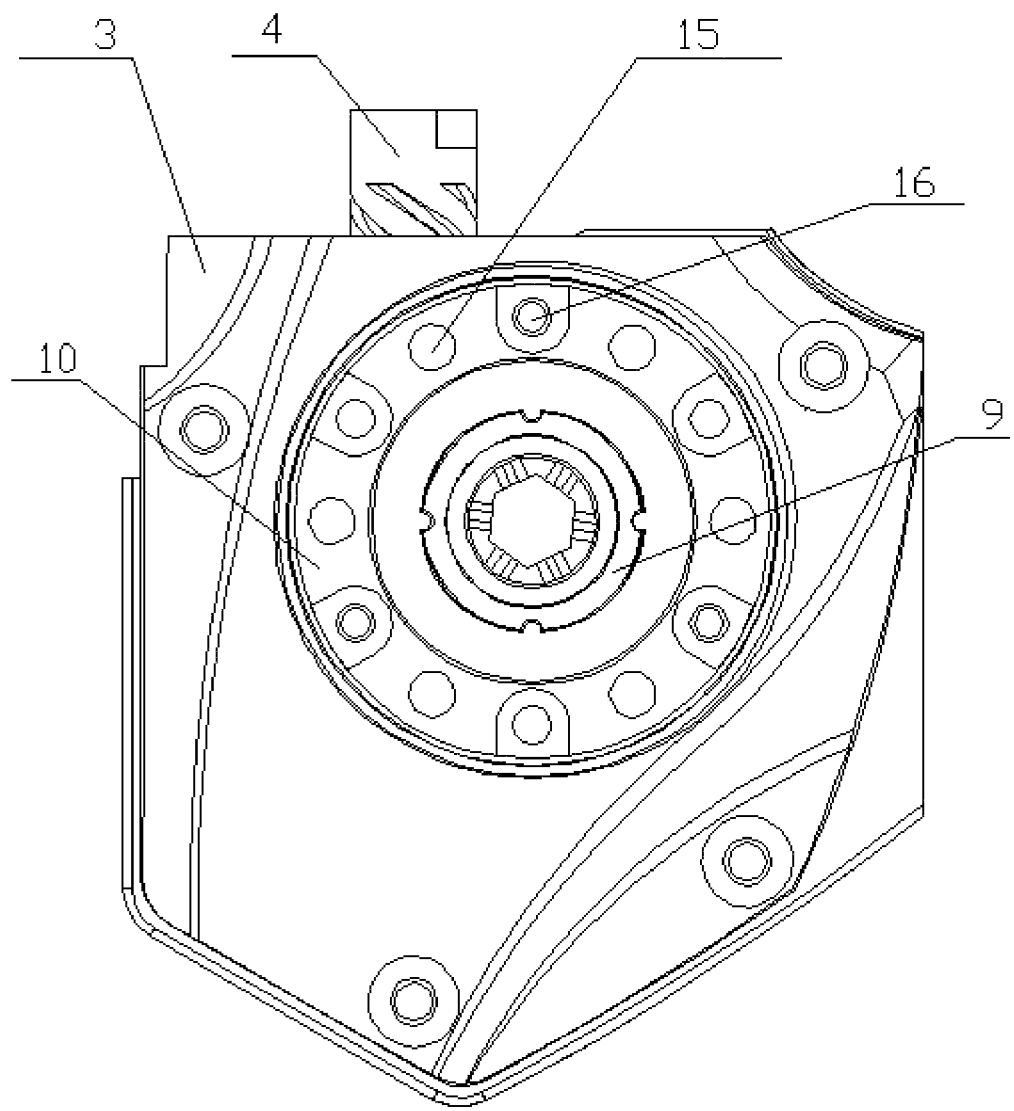
FIG. 2 is a left view of FIG. 1.
Figure 3:
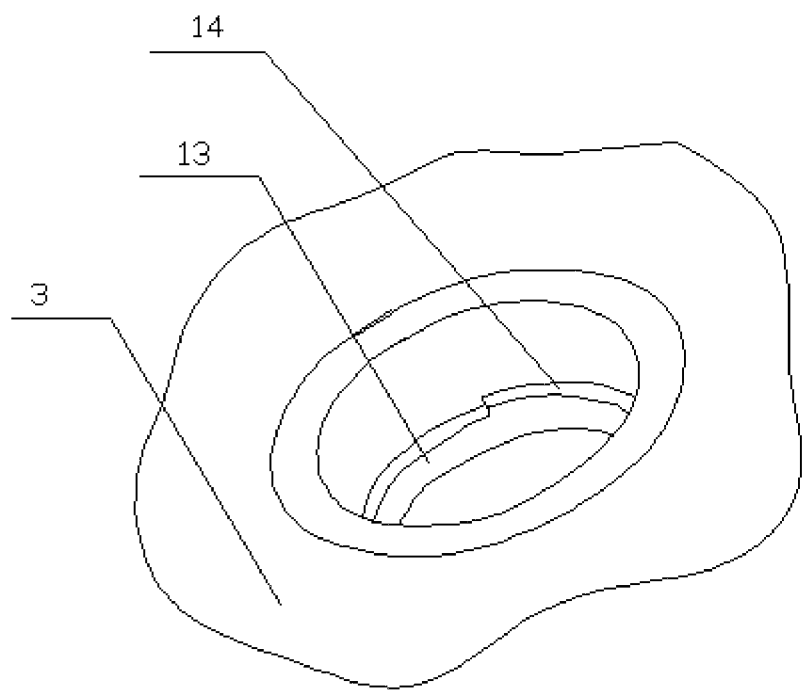
FIG. 3 is a schematic partial view of the side lid according to the first embodiment.
Figure 4:
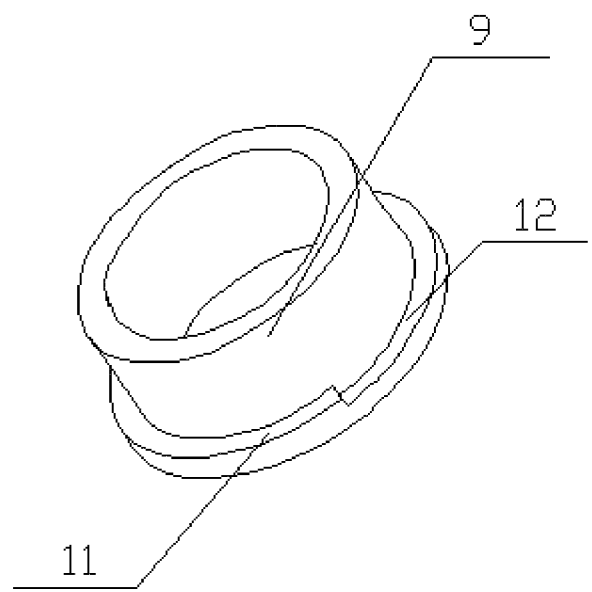
FIG. 4 is a schematic structural view of the first adjustment knob according to the first embodiment.

As shown in FIGS. 1-4, the present invention includes a drive spindle 1, a housing consisting of a main cover 2 and a side lid 3, and a gear pair consisting of a rack 4 and a main gear 5 on the drive spindle 1.

Middle portions of the main cover 2 and the side lid 3 are respectively provided with a bearing mounting counterbore, bearings 6 and 7 are respectively mounted at two ends of the drive spindle 1, the drive spindle 1 is mounted in the bearing mounting counterbores of the main cover 2 and the side lid 3 through the bearings 6 and 7 at two ends, the bearing 6 at one end of the side lid 3 is bonded to the main gear 5, a backlash exists between the main gear 5 and the rack 4. An adjustment mechanism 8 adjusting a gear pair backlash outside the housing is further included.

The adjustment mechanism 8 includes a first adjustment knob 9 and a first fixed gland 10, the first adjustment knob 9 is an annular body, the right end of the first adjustment knob 9 is provided with an annular flange 11, the left sidewall of the annular flange 11 is provided with a spiral ramp 12; the middle portion of the side lid 3 is provided with a circular through hole, the through hole is internally provided with an annular shoulder 13, and the right sidewall of the annular shoulder 13 is provided with a spiral boss 14 mating with the spiral ramp 12 on the left sidewall of the annular flange 13 on the first adjustment knob 9.

The left end of the first adjustment knob 9 passes through the circular through hole of the side lid 3 from an inner side 3 of the side lid to extend out of the side lid 3, the right end of the first adjustment knob 9 is bonded to the bearing 6 on the left end of the drive spindle 1, the left end of the first adjustment knob 9 is fixedly connected with the first fixed gland 10, outer peripheries of the first fixed gland 10 are evenly provided with fixed screw holes 15, and the fixed screw holes 15 on the outer peripheries of the first fixed gland 10 are connected with the side lid 3 through screws 16.

The adjustment principle of the first embodiment is as follows: first release the screws 16 on the side lid 3, rotate the first fixed gland 10 to drive the first adjustment knob 9 to rotate, drive change of relative positions of the "spiral" ramp 13 of the annular flange 11 and the "spiral" boss 14 of the annular shoulder 13, drive axial movement of the first adjustment knob 9, to achieve adjustment on a backlash between the main gear 5 and the rack 4, and upon adjustment, fasten the screws 16 on the side lid 3.

Second Embodiment

The structure of the second embodiment is basically the same as that of the first embodiment, and their difference lies in the adjustment mechanism. The adjustment mechanism is mainly described below.

Figure 5:
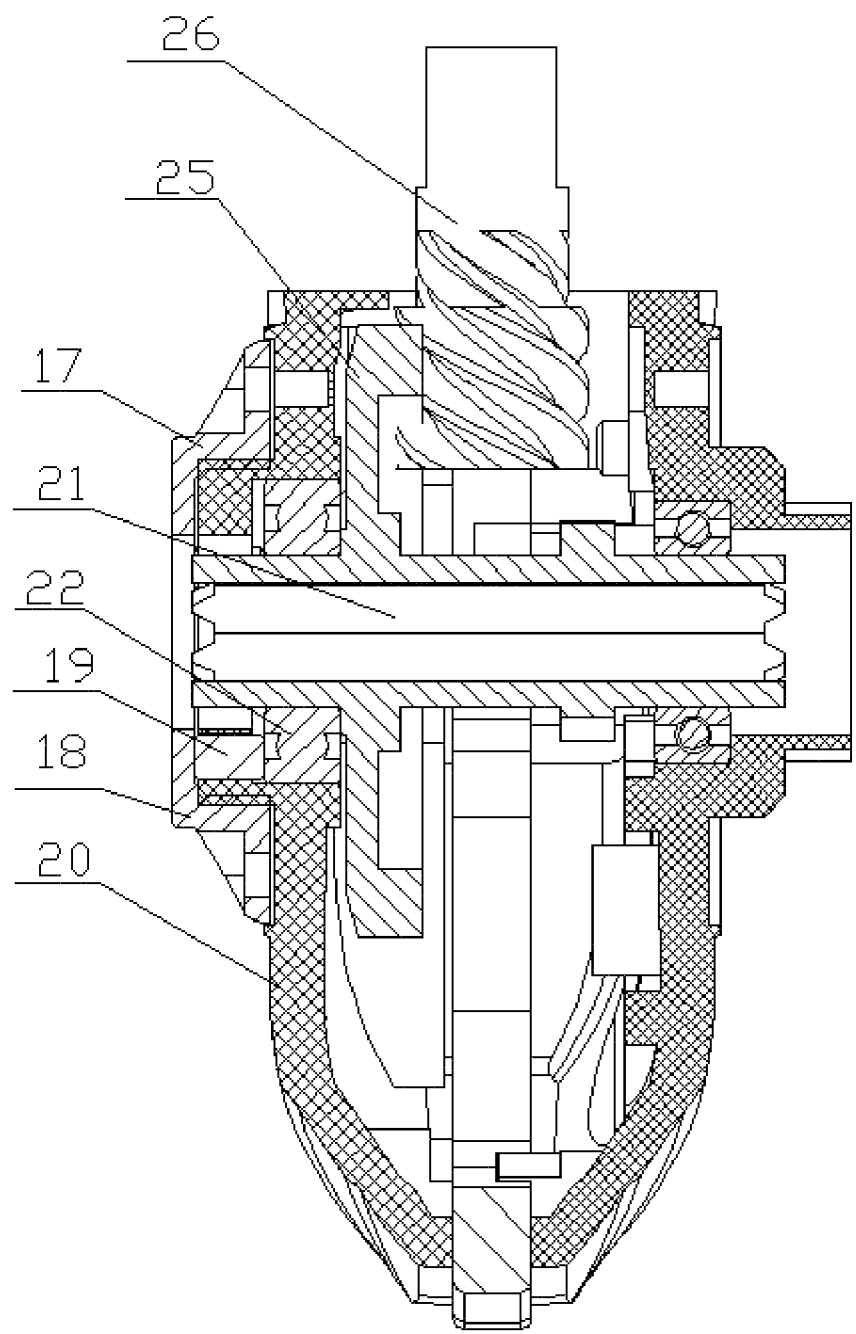
FIG. 5 is a schematic structural view of a second embodiment.
Figure 6:
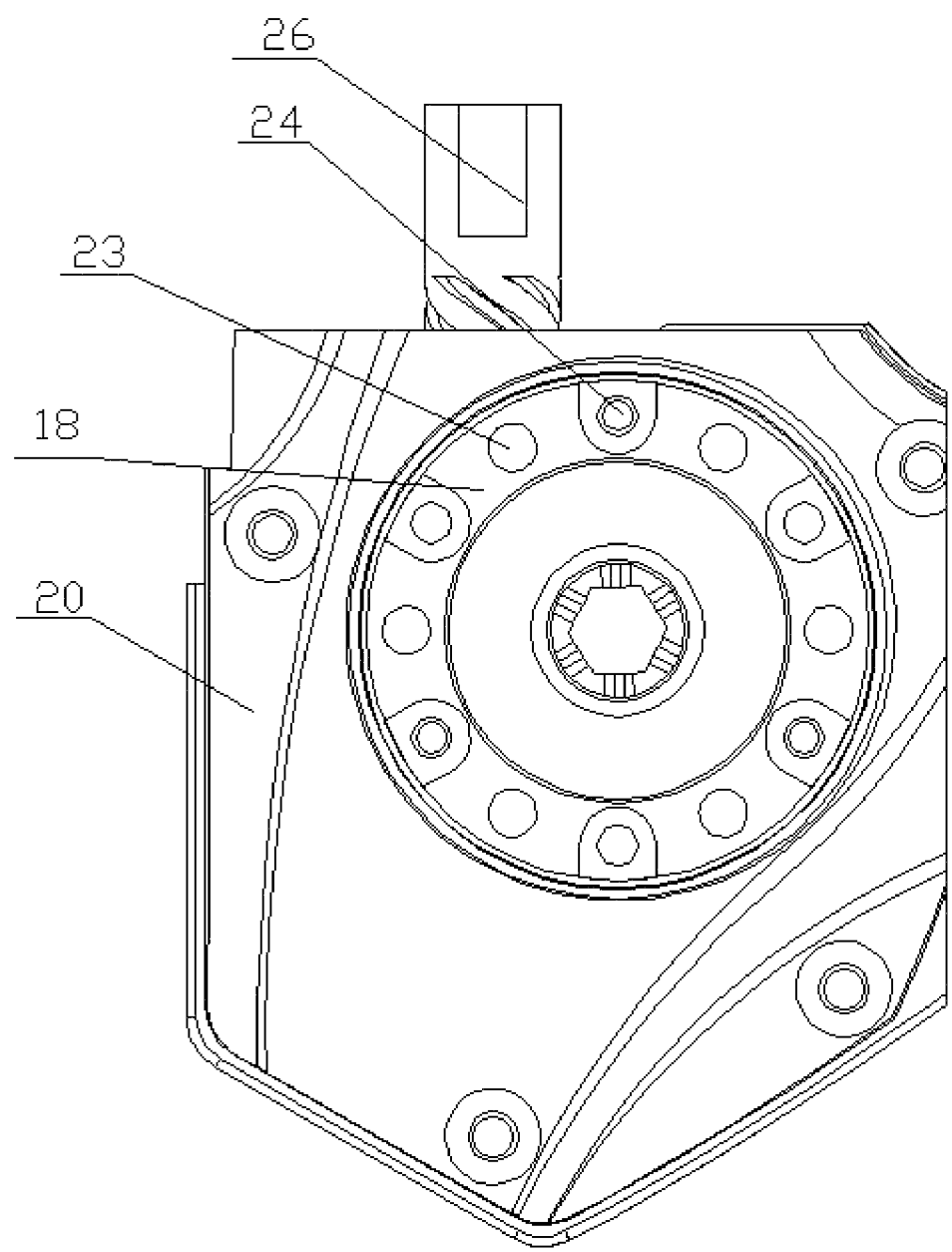
FIG. 6 is a left view of FIG. 5.

As shown in FIGS. 5 and 6, the adjustment mechanism 17 includes an adjustment gland 18 and an adjustment mandrel 19, the adjustment mandrel 19 is placed in the adjustment gland 18, the adjustment gland 18 is provided with an inner thread, the left portion of the side lid 20 is provided with an outer thread mating with the inner thread of the adjustment gland 18, and the adjustment gland 18 is connected onto the outer thread of the side lid 20 in a threaded manner.

The middle portion of the side lid 20 is provided with a through hole, the adjustment mandrel 19 passes through the through hole in the middle portion of the side lid 20, the right end of the adjustment mandrel 19 is bonded to the bearing 22 on the left end of the drive spindle 21, outer peripheries of the adjustment gland 18 are evenly provided with fixed screw holes 23, and the fixed screw holes 23 on the outer peripheries of the adjustment gland 18 are connected with the side lid 20 through screws 24.

The adjustment principle of the second embodiment is as follows: first release the screws 24 on the side lid 20, rotate the adjustment gland 18, drive axial movement of the adjustment mandrel 19, drive axial movement of the bearing 22 by the adjustment mandrel 19, to achieve adjustment on a backlash between the main gear 25 and the rack 26, and upon adjustment, fasten the screws 24 on the side lid 20.

Third Embodiment

The structure of the third embodiment is basically the same as that of the first embodiment, and their difference lies in the adjustment mechanism. The adjustment mechanism is mainly described below.

Figure 7:
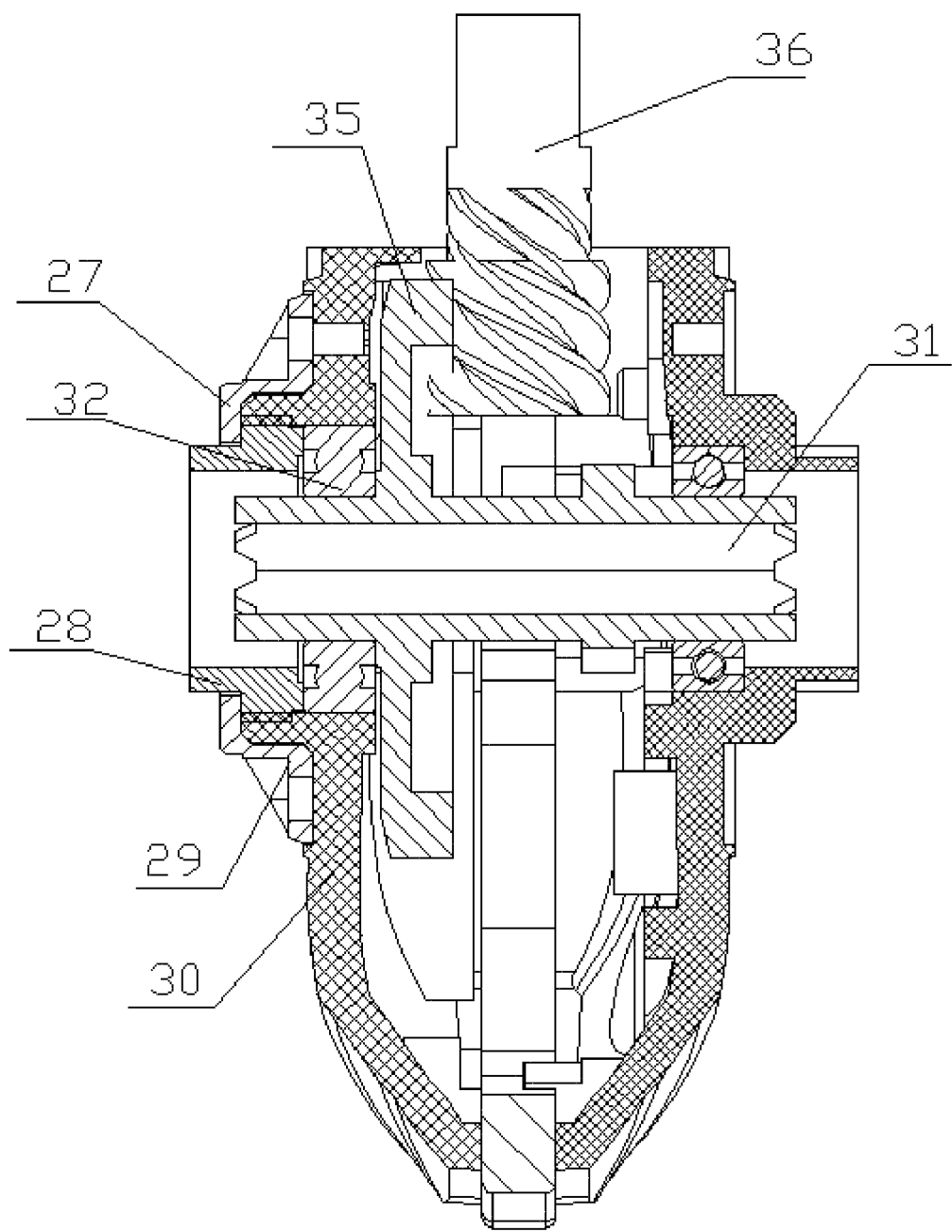
FIG. 7 is a schematic structural view of a third embodiment.
Figure 8:
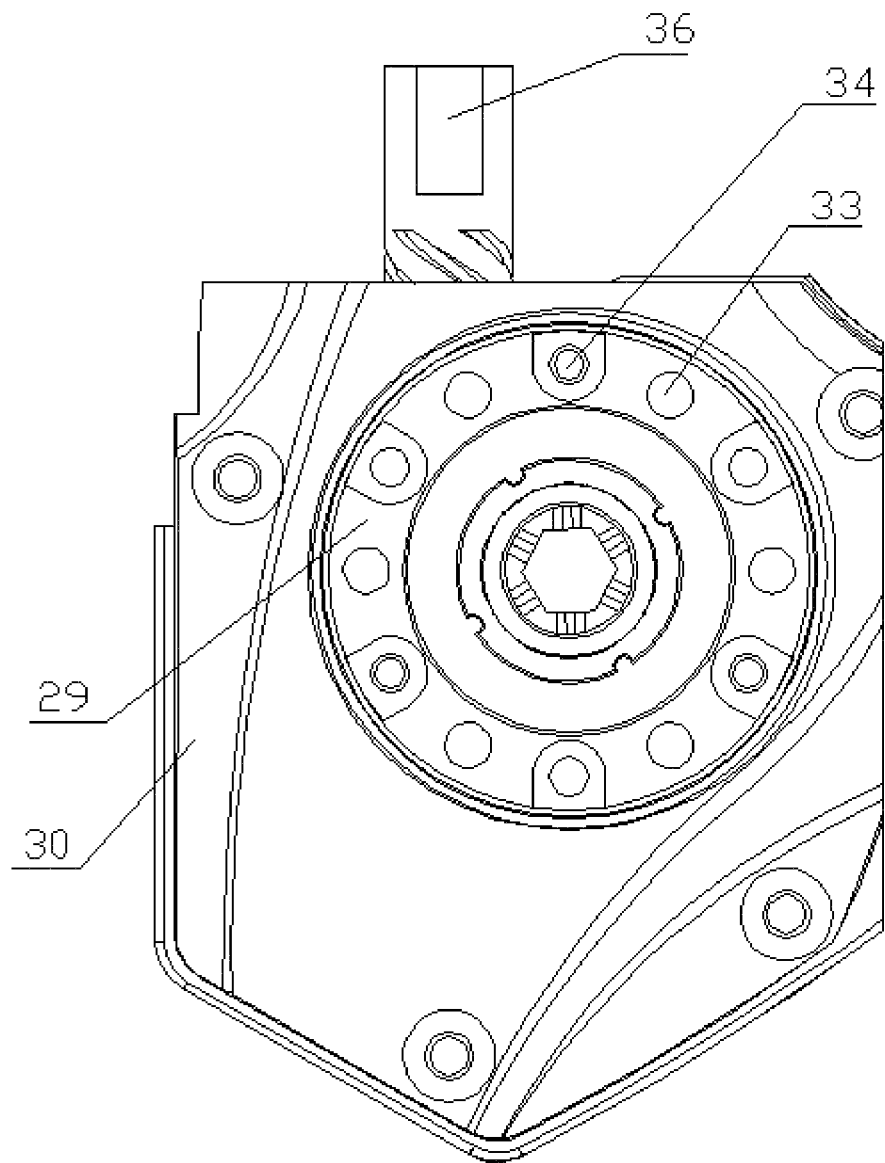
FIG. 8 is a left view of FIG. 6.

As shown in FIGS. 7 and 8, the adjustment mechanism 27 includes a second adjustment knob 28 and a second fixed gland 29, the right portion of the second adjustment knob 28 is provided with an outer thread, the middle portion of the side lid 30 is provided with a round hole, the round hole is internally provided with an inner thread mating with the outer thread of the second adjustment knob 28, the right portion of the second adjustment knob 28 is connected into the round hole of the side lid 30 in a threaded manner, the right portion of the second adjustment knob 28 is bonded to the bearing 32 on the left end of the drive spindle 31, the left portion of the second adjustment knob 28 extends outside the side lid 30, the second fixed gland 29 is fixedly connected with the second adjustment knob 28, outer peripheries of the second fixed gland 29 are evenly provided with fixed screw holes 33, and the fixed screw holes 33 on the outer peripheries of the second fixed gland 29 are connected with the side lid 30 through screws 34.

The adjustment principle of the third embodiment is as follows: first release the screws 34 on the side lid 30, drive the bearing 32 to move left and right by rotating the second adjustment knob 28, to achieve adjustment on a backlash between the main gear 35 and the rack 36, and upon adjustment, fasten the screws 34 on the side lid 30.

What is claimed is:

1. An externally-adjustable fishing reel drive gear pair backlash adjustment mechanism, comprising: a drive spindle, a housing including a main cover and a side lid, and a gear pair including a rack and a main gear on the drive spindle; middle portions of the main cover and the side lid being respectively provided with a bearing mounting counterbore, bearings being respectively mounted at two ends of the drive spindle, the drive spindle being mounted in the bearing mounting counterbores of the main cover and the side lid through the bearings at said two ends, the bearing of the side lid being bonded to the main gear, a backlash existing between the main gear and the rack; and an adjustment mechanism adjusting a gear pair backlash outside the housing.

2. The externally-adjustable fishing reel drive gear pair backlash adjustment mechanism according to claim 1, wherein the adjustment mechanism comprises a first adjustment knob and a first fixed gland, the first adjustment knob is an annular body, a right end of the first adjustment knob is provided with an annular flange, a left sidewall of the annular flange is provided with a spiral ramp; the middle portion of the side lid is provided with a circular through hole, the through hole is internally provided with an annular shoulder, a right sidewall of the annular shoulder is provided with a spiral boss mating with the spiral ramp on the left sidewall of the annular flange on the first adjustment knob; a left end of the first adjustment knob passes through the circular through hole of the side lid from an inner side of the side lid to extend out of the side lid, the right end of the first adjustment knob is bonded to the bearing on a left end of the drive spindle, the left end of the first adjustment knob is fixedly connected with the first fixed gland, outer peripheries of the first fixed gland are evenly provided with fixed screw holes, and the fixed screw holes on the outer peripheries of the first fixed gland are connected with the side lid through screws.

3. The externally-adjustable fishing reel drive gear pair backlash adjustment mechanism according to claim 1, wherein the adjustment mechanism comprises a second adjustment knob and a second fixed gland, a right portion of the second adjustment knob is provided with an outer thread, the middle portion of the side lid is provided with a round hole, the round hole is internally provided with an inner thread mating with the outer thread of the second adjustment knob, the right portion of the second adjustment knob is connected into the round hole of the side lid in a threaded manner, a right end of the second adjustment knob is bonded to the bearing on a left end of the drive spindle, a left portion of the second adjustment knob extends outside the side lid, the second fixed gland is fixedly connected with the second adjustment knob, outer peripheries of the second fixed gland are evenly provided with fixed screw holes, and the fixed screw holes on the outer peripheries of the second fixed gland are connected with the side lid through screws.

4. The externally-adjustable fishing reel drive gear pair backlash adjustment mechanism according to claim 1, wherein the adjustment mechanism comprises an adjustment gland and an adjustment mandrel, the adjustment mandrel is placed in the adjustment gland, the adjustment gland is provided with an inner thread, a left portion of the side lid is provided with an outer thread mating with the inner thread of the adjustment gland, the adjustment gland is connected onto the outer thread of the side lid in a threaded manner; the middle portion of the side lid is provided with a through hole, the adjustment mandrel passes through the through hole in the middle portion of the side lid, a right end of the adjustment mandrel is bonded to the bearing on a left end of the drive spindle, outer peripheries of the adjustment gland are evenly provided with fixed screw holes, and the fixed screw holes on the outer peripheries of the adjustment gland are connected with the side lid through screws.

* * * * *